United States Patent [19]

Bjerk et al.

[11] 4,042,085
[45] Aug. 16, 1977

[54] FRICTION COUPLING

[75] Inventors: Roger O. Bjerk, Edelstein; William D. Brandon; Frederick S. Engleking, both of Peoria; John P. Jero, Washington, all of Ill.

[73] Assignee: Caterpillar Tractor Co., Peoria, Ill.

[21] Appl. No.: 684,816

[22] Filed: May 10, 1976

Related U.S. Application Data

[63] Continuation of Ser. No. 544,148, Jan. 27, 1975, abandoned, which is a continuation-in-part of Ser. No. 366,967, June 4, 1973, Pat. No. 3,898,361.

[51] Int. Cl.² .................. F16D 13/60; F16D 69/02
[52] U.S. Cl. .................................. 192/57; 106/36; 188/251 A; 188/264 E; 192/70.14; 192/107 M; 192/113 B; 260/42.18; 428/64; 428/325; 428/421
[58] Field of Search .............. 192/57, 70.14, 107 M, 192/113 B; 188/251 A, 264 E; 106/36; 260/42.18; 428/64, 325, 421

[56] References Cited

U.S. PATENT DOCUMENTS

| 3,073,424 | 1/1963 | Russell | 192/113 B |
|---|---|---|---|
| 3,365,355 | 1/1968 | Netsch | 428/421 X |
| 3,526,306 | 9/1970 | Bentz et al. | 188/251 A |
| 3,534,842 | 10/1970 | Davison, Jr. | 192/113 B |
| 3,841,949 | 10/1974 | Black | 192/107 M |

Primary Examiner—Allan D. Herrmann
Attorney, Agent, or Firm—Phillips, Moore, Weissenberger, Lempio & Majestic

[57] ABSTRACT

A friction coupling which utilizes a friction plate composed of high modulus asperities incorporated into a reboundably compressible elastomeric matrix for selective rotational engagement with a relatively noncompressible reaction plate between which is directed a flow of fluid with the asperities hydrodynamically wedging such fluid into a relatively thin load supporting film between the asperities and the reaction plate which film absorbs substantially all of the energy of engagement in the shearing effect of the fluid during relative rotation of the plates.

9 Claims, 8 Drawing Figures

Fig-1-
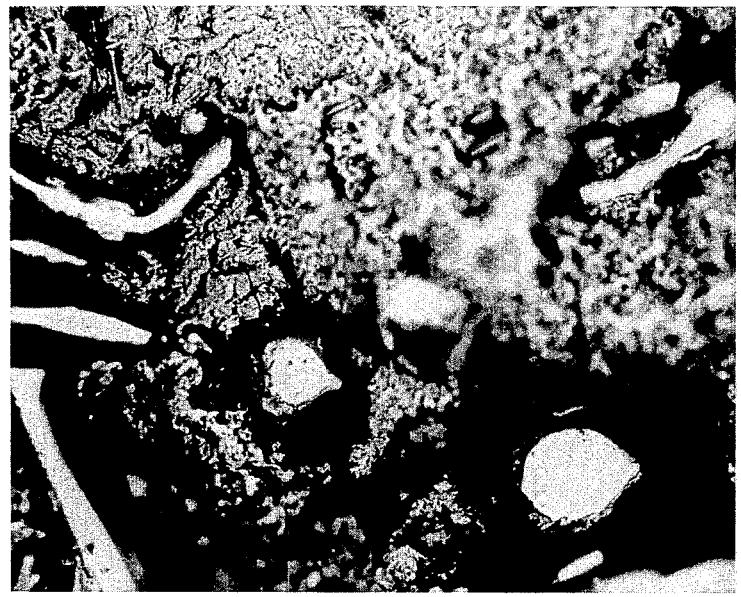
Fig-2-

Fig-3-
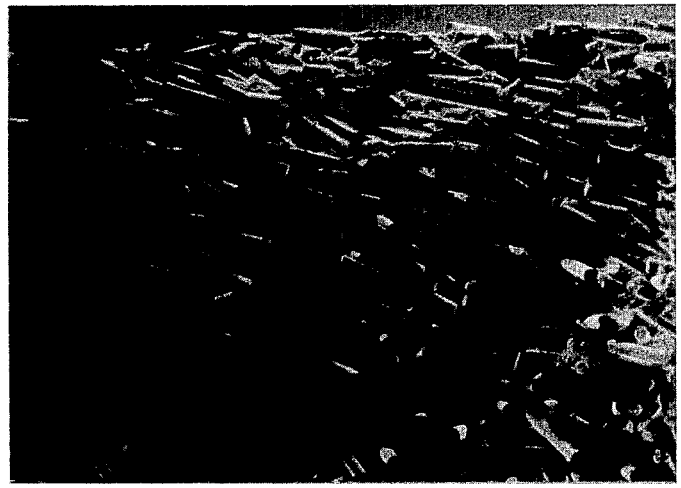
Fig-4-

FRICTION COUPLING

CROSS REFERENCE TO RELATED APPLICATIONS

This is a continuation of Ser. No. 544,148, filed Jan. 27, 1975, now abandoned which is a continuation-in-part of application Ser. No. 366,967, now U.S. Pat. No. 3,898,361 entitled, "Fluoroelastomer Based Composite Material", filed June 4, 1973.

BACKGROUND OF THE INVENTION

This invention relates to composite materials. More specifically, this invention relates to composite friction materials which exhibit high, stable, coefficients of friction over a wide temperature range.

The elastomeric materials heretofore proposed for use as materials have generally proven to be unsatisfactory when exposed to high ambient working temperatures such as encountered, for example, in clutch and brake applications in heavy duty service vehicles. Typically, such materials have been based on heat-hardenable resins such as phenol-aldehyde resins which tend to heat-decompose under the high peak and bulk temperature conditions created by the sustained and/or heavy loading forces experienced in the clutch and brake systems of these vehicles while operating. As a result of this decomposition, the physical properties of these materials typically deteriorate, and the consequent disintegration of the material and dispersal of the products of heat decomposition generally interfere with the functioning of the friction unit. Furthermore, many times after friction material comprising a partially heat-decomposed heat-hardenable resin has cooled, the material will exhibit inconsistency with respect to coefficient of friction.

These conditions, as well as other problems associated with these and similar friction materials, result in a loss of efficiency in the friction unit and unreliability in the service vehicle, which is highly undesirable.

Many attempts have been made to obviate the problems associated with the elastomers in general use as friction material bases. Many different resins have been experimented with, in attempts to obtain a friction material which possesses a high, stable coefficient of friction over a wide temperature range. Modification of the heat-hardenable resins with other polymeric materials has been attempted. Many of these friction material formulations have not performed well. Other formulations have required multi-step procedures which are costly in terms of labor and frequently in terms of the material used in these formulations.

Importantly, also, many of these known friction materials require a bonding agent to affix them to the backing plate or "core" portion of the friction element. This requirement severely restricts the scope of the molding methods and mold configurations employable in forming these friction elements. In injection molding, for example, the bonding agent is subject to scuffing during the molding process, which deactivates or destroys the bond and renders this molding process useless with these friction elements. In general, where bonding agents must be utilized, only compression molding and relatively simply mold configurations can be employed in the process of molding the friction element.

In order to obtain a friction material with a usefully high coefficient of friction which is stable over a wide temperature range, the industry has most usually used nonresilient inorganic friction materials such as sintered bronze. Although the friction characteristics of this and similar metallic materials have been generally satisfactory under high temperature conditions, the high modulus or lack of resiliency of these materials and their resultant inability during operation to conform to the friction element mating surface and absorb adequate energy result in relatively high wear rates and shortened life. Furthermore, great care must be taken in the type and viscosity of oil used in conjunction with such friction materials during use to ensure that the desired coefficient of friction is not impaired.

It has been determined by actual tests that the bronze clutch material, when employed in the high load oil-cooled clutch environment of a transmission for a heavy duty earthmoving vehicle, exhibited some measurable difference in its frictional properties as a function of viscosity grade of the lubricant. It was theorized that at least a part of the energy absorption during the engagement cycle between the friction plate and the reaction plate was through shear of the fluid as well as the boundary lubrication or intimate contact between the clutch plate and reaction plate. It was further recognized that great advantage could be obtained by maintaining the oil film thickness to a minimum dimension in order to permit more of the energy of engagement to be absorbed by shear in the oil film and that a further advantage would be gained by sustaining such thin film in the order of a few microinches during a longer portion of the engagement cycle. Several well known principles of fluid mechanics were considered to aid in this development. For example, the oil film thickness between a rotary friction plate and a stationary substantially flat reaction plate is a function of the radius of curvature or size of the protuberances or asperities in the friction material under a given load. Accordingly, the smaller the asperities in the surface of the friction plate, the thinner the oil film thickness. It is also known that the thinner the oil film thickness, the greater rate of shear and, therefore, the greater shear force and energy that the oil film is capable of absorbing. Accordingly, a great plurality of such asperities in the surface of the friction plate produces greater fluid wedging effect of the oil film as it is squeezed between the multitude of asperities and the reaction plate to produce a substantial drag on the friction plate. Furthermore, the greater the amount of oil film in thin film shear, as discussed above, the greater the energy absorption. Accordingly, the substantially large number of asperities in the surface of the friction plate results in a greater amount of oil being retained over the entire surface area of the plate due to the trapping effect and cavitation of oil on the trailing sides of the asperities over the surface area between the friction material plate and its mating reaction plate. It is further recognized that the greater the real viscosity or internal resistance to flow of fluid in contact between the plates, the greater the energy absorption obtainable in the thin film shear. Such real or developed viscosity during the engagement cycle is, of course, enhanced by the substantial number of asperities through which the engagement pressure is transmitted to the oil film in shear. It is also known that the greater the relative motion between the friction plate and the reaction plate, the greater the shear and, again, the greater energy absorption obtained. In using the above-discussed simple fluid mechanics principles, the problem was prsented of how best to maximize energy absorption between a pair of friction plates through a fluid film with the greatest reliability and over substantially the entire range of the engagement cycle.

Accordingly, it is an object of the present invention to provide an improved friction coupling which utilizes an improved friction material capable of cooperating with a fluid for producing a thin fluid film between it and the reaction member wherein a substantial portion of the energy of plate engagement is absorbed in shear of the fluid film for greater wear resistance, temperature stability and a higher coefficient of friction than heretofore obtainable.

Another object of the present invention is to provide an improved friction coupling in which the friction plate is formed of a relatively soft elastomeric material and has intermixed therewith a plurality of relatively high modulus asperities in the surface thereof which cause a hydrodynamic wedging of the fluid to establish a load absorbing film of separating fluid between the friction plates for maximizing the absorption of energy during plate engagement.

It is a further object of this invention to provide a friction coupling utilizing a friction material composition with high dynamic and static coefficients of friction over a wide temperature range.

It is a further object of this invention to provide a friction coupling utilizing a friction material composition which can readily be bonded to a metal core material.

It is an additional object of this invention to provide a friction coupling utilizing a friction material composition which can be injection or compression molded, and which can be molded in conjunction with complex mold configurations.

It is also an object of this invention to provide a friction coupling utilizing a conformable, long-wearing friction material composition with a high, stable coefficient of friction over a wide temperature range.

Other objects and purposes of this invention will be apparent to those skilled in the art from the disclosure contained herein.

BRIEF SUMMARY OF THE INVENTION

Broadly, the composite friction material utilized in this invention comprises a compounded elastomeric matrix in which are suspended minute particles of a friction-producing agent, or "high modulus asperities". The fluoroelastomer matrix has excellent properties of thermal stability, and at the same time provides a relatively low modulus resilient matrix which permits the friction material to conform readily to inherently rapid changes between it and its mating surface, thereby distributing dynamic stresses and energy absorption over a much larger true friction surface area than is permitted with high modulus metallic or other non-resilient materials.

Maximum energy absorption rates of from about 3 to about 5 HP/in$^2$ of fluoroelastomer friction material are typical. In comparison with the high modulus materials, such a low modulus matrix significantly increases the load-carrying capabilities of the friction element of which it is a part, and further, possesses superior wear characteristics when compounded with high modulus asperities as herein disclosed.

The high modulus asperities, generally glassy or related substances, are compounded with the fluoroelastomer in sufficient quantities to produce a relatively high concentration of these asperities on the frictional surface of the fluoroelastomer matrix. These asperities further serve to strengthen the support matrix and lessen compression set or permanent deformation under applied loads.

The compounded friction material is then applied to the core of the friction element, for example as disclosed in copending application Ser. No. 307,420, by William D. Brandon, filed Nov. 17, 1972, now abandoned of common assignment herewith.

When such improved friction material is utilized in a disc-type oil-cooled transmission clutch or brake environment for frictional engagement with a reaction plate of relatively rigid noncompressible material, the asperities create a hydrodynamic wedge in the oil passing between the friction material and the reaction plate with the microscopic size of the asperities producing a relatively thin oil film. This increases the viscosity of the oil film fully to support the load imposed between the friction plate and the reaction plate prior to their complete engagement. Both the viscous shear of the fluid and the pressure drag created by the hydrodynamic wedging of oil ahead of the asperities and the cavitation behind the asperities contribute to the frictional force. This makes it possible to use the oil film to achieve dynamic frictional braking exclusive of the elastomeric material in the frictional surface during the major portion of the engagement cycle which produces greater wear resistance and improved temperature stability with a higher coefficient of friction than previously achieved with conventinal friction materials.

DESCRIPTION OF THE DRAWINGS

FIG. 1 is a photomicrograph (at 500× magnification) of the surface of material according to the invention after this surface has been "worn in". The rod-like asperities are clearly seen with the worn flat surfaces thereon apparent.

FIG. 2 is a photomicrograph (at 500× magnification) of another sample of material according to the invention. The asperities are noted to have flattened upper surfaces produced upon "wearing in" of the material.

FIG. 3 is a photomicrograph (at 200× magnification) of a cross section through the improved friction material utilized in the present invention showing a plurality of particles of vitreous material dispersed throughout the relatively soft elastomeric matrix and forming asperities protruding above the surface of the matrix.

FIG. 4 is a photomicrograph (at 500× magnification) of another cross sectional view through the improved friction material of the preceding FIGS.

DETAILED DESCRIPTION OF THE INVENTION

Figure 5:
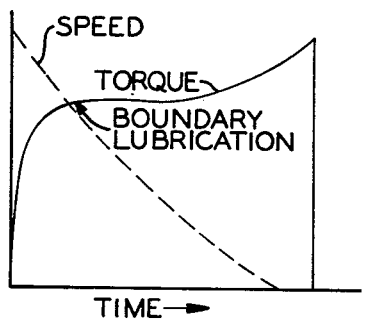
FIG. 5 is a force curve graph representing a conventional clutch or brake operation under simple conditions of engagement.

This invention utilizes an elastomer based material having vitreous particles dispersed therethrough. In the described embodiment a fluoroelastomer is used; however, it will be apparent that other elastomers such as polyacrylate, silicone, fluorosilicone, chloroprene, acrylonitrile, or urethane may be used without departing from the spirit of the present invention. This composite material exhibits tensile strengths comparable with the elastomers alone, but however exhibits better set and stress relaxation resistance than the fluoroelastomers alone.

The fluoroelastomers useful in this invention are exemplified by Viton E60C, a copolymer of hexafluoropropylene and polyvinylidene fluoride which is commercially available from E. I. duPont, Inc., Wilmington, Del., and Fluorel FC2170, commercially available from the 3M Company of Minneapolis, Minn. Preferably, Viton E60C or Fluorel FC2170 are employed to form the matrix of the friction material.

To form the composite material of the invention, the fluoroelastomer has admixed therewith particles of a relatively hard material, herein referred to as "asperities". These asperities are preferably glassy materials or ceramic materials in very small beads, fibers or other irregular shapes.

Although the useful size of these asperities may vary somewhat according to the nature of the material and other factors, fiberglass particles of from about 0.0001 to about 0.005 inch in diameter, and preferably about 0.0005 inch in diameter, will yield the desired results. Such particles advantageously have a length to diameter ratio of from about 3 to about 100. The fiberglass or other asperities may also be compounded in the form of chips, fibers, spheres or other convenient shapes, although fibers are generally preferable.

The asperities are compounded with the fluoroelastomer at a rate sufficient to give and maintain a high surface concentration of asperities in the finished friction facing. Preferably, about 20 to about 50 percent by weight of fiberglass particles to about 30 to about 50 percent by weight of fluoroelastomer are admixed to provide a randomly irregular macroscopic surface finish on the friction material. It may in some instances, however, be desirable to exceed these proportions, depending on the frictional characteristics desired in the finished material.

It is contemplated that carbon black will be incorporated into the fluoroelastomer, conveniently at the same time or prior to the time the asperities are incorporated. This additive is preferably added in amounts of about 12 to about 30 percent by weight of carbon black to about 30 to about 50 percent by weight of fluoroelastomer. Additionally, accelerators, stabilizers, and curing agents, inter alia, commonly used in fluoroelastomer products, will usually be compounded with the fluoroelastomer.

The asperitis, carbon black, and other additives are incorporated into the fluoroelastomer by conventional mixing techniques, for example, in a Banbury mixer. Ideally, the asperities should be concentrated near the surface, or the frictionally active portion, of the fluoroelastomer matrix. However, in practicality this is difficult to achieve, and satisfactory results are obtained by intimately incorporating the asperities throughout the fluoroelastomer to obtain a random orientation of the asperities through the matrix.

The fluoroelastomer may be bonded to a core of steel or other metal by the process of copending application Ser. No. 307,420 noted above. Broadly, this process comprises incorporating CaO into the fluoroelastomer prior to curing, and then at high temperatures curing the fluoroelastomer in pressed contact with the core material. Conveniently, the CaO may be incorporated into the fluoroelastomer at the same time as are the asperities and other additives noted above.

Conventional molding techniques, such as compression, transfer or injection molding, are utilized for forming the fluoroelastomer/backing plate friction element. In applying the friction material to the backing plate of the friction element, it is usually desirable to apply the friction material to the plate in an amount sufficient to obtain a finished thickness of friction material of from about 0.020 to about 0.250 inches, especially in applications where the material is utilized in clutches.

The friction material of this invention exhibits a high, stable, dynamic coefficient of friction through a wide range of sliding speeds and normal loads against a wide variety of opposing faces and finishes. For example, dynamic friction coefficients ($\mu_D$) of from about 0.14 to about 0.06 at from about 2,000 to 11,000 ft/min sliding speed and from about 50 to about 680 psi of face pressure on gross area typically can be expected in frictiom elements comprised of the friction material of this invention.

Additionally, good static ("breakaway") coefficients of friction from about 0.17 to about 0.26 are characteristic of this fluoroelastomer friction material.

The friction material of this invention is capable of operating against mating surfaces of a variety of types, for example, hard or soft steel, cast iron, sintered metals, and ground, deburred or lapped surfaces. However, the mating surface finish may adversely affect the friction characteristics of the friction material if this surface is too roughly or too finely finished. Generally, a mating surface finish of about 10 to about 45 mu will result in satisfactory performance of the friction material.

The fluoroelastomer friction material of this invention is further characterized by low wear and dimensional stability during extended dynamic operation. Furthermore, with properly modulated engaging pressure, the material exhibits a relatively flat torque curve that "wrings in" about 10-50 percent above the dynamic torque.

The friction material of this invention will respond according to test results over a wide operating surface temperature range even up to about 680° F. In general, the material can be expected to maintain optimum response levels at bulk temperatures below about 475° F; i.e., where the average surface temperature of the friction material between operations of the friction element is below about 475° F. Maximum peak temperatures, however, may be as high as from about 560° to about 680° F before performance of the friction material is substantially affected.

In general, effective performance of the friction material contemplates operation of the friction element under oil cooled operating conditions. However, a much wider selection of oils may be effectively employed with the chemically inert fluoroelastomer friction material than with, for example, bronze.

In preparing friction elements utilizing the friction material of this invention, it will generally be found that after demolding, few if any of the asperities will be present on the frictional surface of the material. The thin elastomer coating covering the asperities must therefore be worn off to expose the asperities and hence to obtain a stable coefficient of fraction for the element. This may either be done in situ, allowing the rubber coating to be worn off during an initial break-in period of the friction element in the service vehicle, or by pregrinding of the friction material before installation of the element. The amount of matrix material which must be removed to obtain a desirably stable coefficient of friction for the material as a whole will of course vary according to the specific formulation. However, it is generally advantageous to sufficiently expose a major portion of the underlying asperities to a point where these asperities are in contact with the mating surface.

During early use, these asperities are ground to a point where they appear to be well-worn, as shown in FIGS. 1 and 2, to obtain a stable coefficient of friction. The asperities are mechanically held in the matrix in nonbonded relation in order to enhance the noncompressive setting characteristic of the material.

The following examples are provided only to further illustrate specific friction material compositions of this invention and pertinent frictional characteristics thereof, without limiting the invention in any manner:

Example 1

| Ingredients | Amount (Parts by Weight) | Size |
|---|---|---|
| Viton E60 | 100 parts | |
| Type E Fiberglass | 110 parts | 0.0005" diameter |
| Carbon Black | 60 parts | |
| Accelerators Stabilizers Curing Agents | Minor amounts | |
| CaO | 5 parts | |

The above ingredients were compounded by mixing in a Banbury mixer to achieve an even dispersion of the additives into the fluoroelastomer matrix, with random orientation of the glass particles. The mixture was applied to a steel backing plate and pressed to this plate into the desired pattern under about 2,500 psi. The mixture then was cured for 30 seconds at 390° F. Sufficient mixture material was applied to the plate to give a thickness of material, when cured, of 0.050 inches/face. The cured elastomer and backing plate, i.e., clutch disc, were then postcured at 450° F for 16 hours.

It was found that the friction material possessed a Shore A Hardness of 90-95, and an ultimate tensile strength of 1,900 to 2,100 psi. The clutch friction element made by the process of Example 1 was then subjected to a wear test in an earthmoving vehicle transmission comprising 220,000 cycles, from third speed reverse to third speed forward. 0.008 inches of wear was observed per friction material face element at the conclusion of this test. The friction material was found to have an excellent thermal stability up to 475° F (bulk), and 680° F (peak).

Example 2

| Full Scale Clutch Test Results | |
|---|---|
| Friction Material | As in Example 1 |
| Size O.D. - inches | 12.25 |
| Area/Face - inches | 31 |
| Faces/Clutch | 8 |

Example 2-continued

| | | | | |
|---|---|---|---|---|
| Oil Temperature | | 210° F | | |
| Cycle Time | | 30 seconds | | |
| Reaction Surfaces - Ground and Deburred Soft Steel | | | | |
| Shift | 3R | 1F | 3R | 3F |
| Input RPM | 2,000 | 1,800 | 1,800 | 2,000 |
| Coefficient of Friction | | | | |
| Maximum | 0.110 | 0.110 | 0.116 | 0.112 |
| Minimum | 0.065 | 0.068 | 0.074 | 0.070 |
| Wring-In | 0.073 | 0.075 | 0.083 | 0.083 |
| Clutch Torque lb-ft / in² | | | | |
| Max. Dynamic | 11.2 | 11.7 | 13.3 | 12.6 |
| Wring-In | 12.6 | 13.0 | 14.9 | 14.9 |
| Peak HP/in² | 3.2 | 2.7 | 1.7 | 1.9 |
| Total BTU/in² | 0.65 | 0.51 | 0.48 | 0.73 |
| Plate Temperature | | | | |
| Max. ° F | 494 | 443 | 360 | 390 |
| Bulk ° F | 235 | 225 | 212 | 193 |

Figure 8:
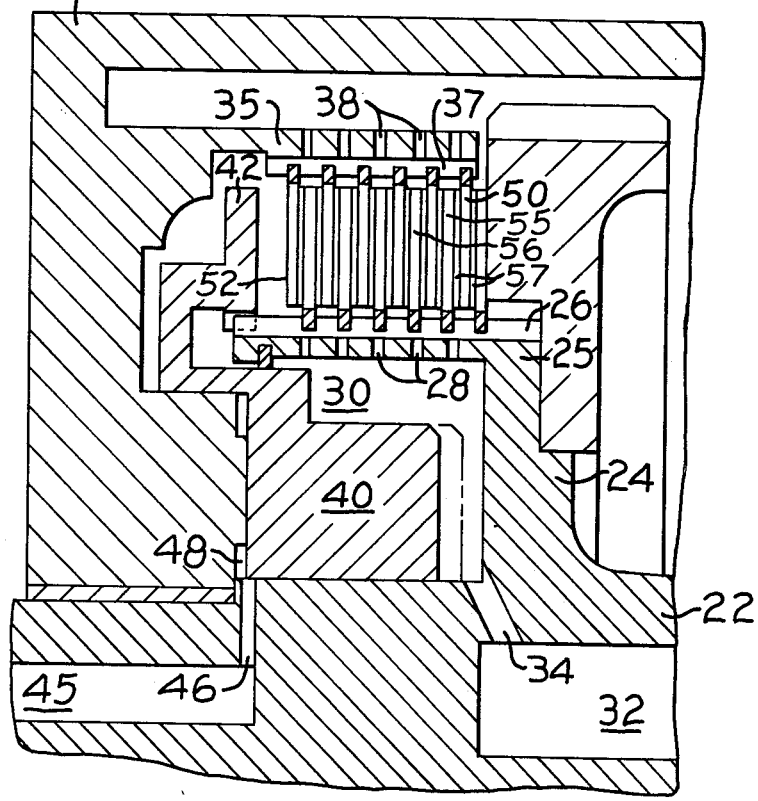
FIG. 8 is a central vertical cross section through a typical disc-type oil-cooled clutch or transmission brake employed on relatively heavy earthmoving vehicles with the improved friction material shown utilized in combination with a continuous flow of hydrodynamic braking fluid.

The above-described improved friction material is specifically intended for use in an oil-cooled disc-type friction coupling utilized in a power train such as a clutch or transmission brake for relatively heavy earthmoving vehicles as depicted in FIG. 8. The representative transmission clutch includes a fluid type housing 20 through which is journaled a rotatable shaft 22. The shaft has an integral annular flange 24 which supports a radially outwardly disposed annular splined ring 25. The ring has a plurality of axially oriented splines 26 and a plurality of oil directing openings 28 extended therethrough between the splines. An oil directing and piston receiving chamber 30 is formed between the ring 25, the flange 24 and the adjacent portion of the shaft 22. A centrally disposed axially extended bore 32 is formed in the shaft 22 and is connected to a source of cooling and hydrodynamic braking fluid, not shown. A port 34 is formed in the shaft 22 between the bore 32 and the chamber 30 for directing the supply of fluid toward the plurality of openings 28 in the ring 25.

A stationary ring 35 is rigidly mounted within the housing 20 in radially spaced circumscribing relation to the ring 25. The ring has a plurality of inner splines 37 between which are disposed a plurality of fluid exhaust openings 38. An annular actuating piston 40 is axially slidably mounted within the chamber 30 and has a radially outwardly extended annular actuating shoe 42 disposed between the inner and outer rings 25 and 35, respectively. A high pressure fluid passage 45 is formed within the shaft 22 in axially spaced relation to the bore 32 and is connected to a source of high pressure fluid, not shown. A radially outwardly extended passage 46 in the shaft 22 communicates such high pressure fluid to a piston actuating chamber 48 in the housing behind the actuating piston 40.

A plurality of externally toothed reaction plates 50 are mounted in meshing engagement within the outer ring 35 on the splines 37 in predetermined axially spaced relation. the reaction plates present opposite substantially flat, smooth surfaces 52 with the plates being constructed of a substantially rigid noncompressive metallic material. A plurality of internally toothed friction plates 55 are mounted on the splines of the inner ring 25 in interleaved relation to the reaction plates and in slightly spaced relation thereto. Each of the friction plates has a metallic core 56 and on each of its opposite sides has bonded thereto the improved friction material 57 utilized in the present invention.

Figure 7:
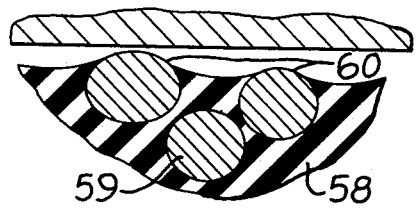
FIG. 7 is a greatly enlarged sectional view through the improved friction material disposed adjacent to a substantially flat reaction plate with a relatively thin energy absorbing oil film produced therebetween.

As best shown in FIG. 7, such improved friction material is constructed of a composition providing a fluoroelastomer matrix 58 having a plurality of particles 59 of a vitreous material intermixed therewith and uniformly distributed throughout the matrix in nonbonded relation. Such particles form a great multitude of asperities 60 or protuberances in the surface of the friction plate for forming a hydrodynamic film of oil between each set of plates as will subsequently be more fully described.

During operation of the transmission, a continuous supply of cooling and hydrodynamic breaking fluid is directed through the openings 28 in the inner rotary ring 25, between each of the interleaved friction plates 55 and reaction plates 50 and outwardly through the discharge openings 38 in the outer stationary ring 35. Upon the introduction of high pressure fluid into the actuating chamber 48, the piston 40 is positioned to the right as shown by the dashed lines in FIG. 8 which causes the shoe 42 to engage the stack of friction and reaction plates to initiate the plate engagement cycle and ultimately complete breaking of the rotary shaft 22. Prior to actual engagement of the asperities 60 in the surface of each of the friction plates with their mating reaction plate, each particle 59 acts as a tiny hydrodynamic bearing. The relatively soft matrix which serves as a carrier for the particles affords the dual function of allowing some deflection or partial recession of the more prominently extended particles into the matrix itself. In harder matrix materials, the hard particles would be destroyed as a result of excessive pressure and possibly torn from the matrix carrier. Secondly, the relatively soft matrix affords improved conformability with any irregularities in the mating surface of the reaction plate and permits a more uniform distribution of pressure over substantially the entire area of the friction plate.

Figure 6:
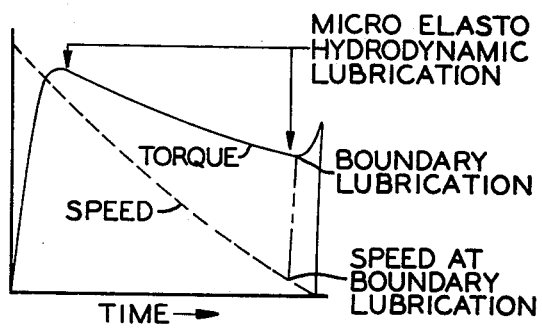
FIG. 6 is a graph showing the force curve under conditions of clutch or brake operation with the improved friction material utilized in the present invention operating under a microelastohydrodynamic condition in conformance with the principles of the present invention.

As previously described, the great number of microscopic asperities 60 in the friction surface of the friction plate 55 produce a relatively thin film of fluid between them and the mating surface of the reaction plate through the hydrodynamic wedging of oil on the leading sides of the particles and the cavitation on their trailing sides as shown in FIG. 7. With the oil film thickness rapidly approaching that permitted by the microscopic particle size relatively early during the engagement cycle, the relatively high rotational speed between the friction plates and reaction plates produce a relatively high shear rate and torque absorption in such relatively thin oil film which is sufficient fully to support the load or pressure of engagement. This is indicated by the graph of FIG. 6 with the declining portion of the curve indicating no contact between the surface of the matrix and the surface of the reaction plate. In direct contrast, it will be noted that the force curve as shown in FIG. 5 with conventional friction materials indicates that the entire load is picked up primarily by the intimate contact of the surfaces of the plates which continues until complete wring-in and expulsion of substantially all of the cooling fluid is achieved. However, with respect to FIG. 6, as the speed falls, oil shear rate reduces together with friction and torque until finally near the end of the engagement cycle the hydrodynamics can no longer be sustained by the particles due to the low speed and the unit goes into boundary lubrication, or wring-in, completing the engagement cycle. It is further noted, however, from the graph of FIG. 6, that the relative speed is very low when such boundary lubrication or wring-in occurs, delaying until the last possible moment any intimate contact of the matrix material with the mating reaction plate, nearly eliminating any load absorption by the matrix material alone.

Accordingly, this produces a greater resistance to wear of the friction material and improved temperature stability with a higher coefficient of friction than heretofore achieved with conventional friction materials.

What is claimed is:

1. A friction coupling comprising:
   a rotatable friction plate formed of a martrix of a relatively soft elastomeric material providing a friction surface and selected from the group of elastomeric materials consisting of polyacrylate, silicone, fluorosilicone, chloroprene, acrylonitrile, urethane, and hexafluoropropylene-vinylidene fluoride copolymer and mixtures thereof;
   a reaction plate of relatively rigid non-compressible material providing a mating surface for selective rotational frictional engagement with said friction surface of said friction plate;
   a plurality of discrete particles of a vitreous or ceramic material intermixed with and dispersed throughout said elastomeric material to provide relatively high modulus asperities in said friction surface with said matrix reboundably deflecting to permit at least partial recession of the more prominently extended particles into the friction surface of the matrix to ensure maximum conformability to said mating surface and uniform distribution of engagement pressure over the entire surface area of the plates; and
   a supply of fluid provided between said plates with the fluid hydrodynamically wedging between the asperities and the mating surface of the reaction plate during relative rotation of the plates for developing and sustaining a film of separating fluid over the asperities that produces a viscous drag upon the friction plate so as to cause substantially all of the energy of plate engagement to be absorbed in shear of said fluid film until just prior to complete engagement of the plates.

2. A friction coupling as in claim 1, in which said elastomeric material comprises a copolymer of hexafluoropropylene and vinylidene fluoride.

3. A friction coupling as in claim 1, in which said elastomeric material comprises polyacrylate.

4. A friction coupling as in claim 1, in which said elastomeric material comprises silicone.

5. A friction coupling as in claim 1, in which said elastomeric material comprises fluorosilicone.

6. A friction coupling as in claim 1, in which said elastomeric material comprises chloroprene.

7. A friction coupling as in claim 1 in which said elastomeric material comprises acrylonitrile.

8. A friction coupling as in claim 1 in which said elastomeric material comprises urethane.

9. A friction coupling comprising:
   a rotatable friction plate formed of a matrix of a relatively soft elastomeric material providing a friction surface;
   a reaction plate of relatively rigid non-compressible material providing a mating surface for selective rotational frictional engagement with said friction surface of said friction plate;
   a plurality of discrete particles of a vitreous or ceramic material intermixed with and dispersed throughout said elastomeric material to provide relatively high modulus asperities with corresponding voids therebetween over substantially the entire surface area of said friction surface with said matrix reboundably deflecting to permit at least partial recession of the more prominently extended particles into the friction surface of the matrix and substantial elimination of said voids to ensure maximum conformability to said mating surface and uniformed distribution of engagement pressure over the entire surface area of the plates; and a free flow supply of fluid provided between said plates with the fluid during movement of the plates toward each other hydrodynamically wedging between the asperities and the mating surface of the reaction plate during relative rotation of the plates for developing and sustaining a film of separating fluid over the asperities that produces a viscous drag upon the friction plate so as to cause substantially all of the energy of plate engagement to be absorbed in shear of said fluid film until just prior to the disappearance of said asperities into the matrix for permitting complete engagement of the entire surface areas of the plate.

* * * * *